United States Patent [19]

Nilsson et al.

[11] Patent Number: 4,716,995

[45] Date of Patent: Jan. 5, 1988

[54] PARKING BRAKE ARRANGEMENT FOR A RAIL VEHICLE BRAKE UNIT

[75] Inventors: Bo S. Å. Nilsson, Eslöv; Krister E. Ljung, Bjärred, both of Sweden

[73] Assignee: SAB Nife AB, Landskrona, Sweden

[21] Appl. No.: 799,170

[22] Filed: Nov. 18, 1985

[30] Foreign Application Priority Data

Nov. 19, 1984 [SE] Sweden ............................. 8405792

[51] Int. Cl.⁴ ............................................. F16D 65/52
[52] U.S. Cl. .................................. 188/197; 188/106 F; 188/72.7
[58] Field of Search .................... 188/106 F, 107, 74, 188/72.7, 72.9, 197

[56] References Cited

U.S. PATENT DOCUMENTS

| | | | |
|---|---|---|---|
| 499,725 | 6/1893 | Ferguson | 74/517 |
| 1,356,032 | 10/1920 | Angus | 74/516 |
| 1,995,135 | 3/1935 | Williams et al. | 188/72.9 X |
| 2,626,032 | 1/1953 | Coursey | 74/520 X |
| 2,953,221 | 9/1960 | Luciem | 188/72.9 |
| 3,099,169 | 7/1963 | Nilsson | 74/516 X |
| 3,572,474 | 3/1971 | Persson et al. | 188/197 |
| 3,608,678 | 9/1971 | Kobayashi | 188/72.6 |
| 3,848,704 | 11/1974 | Falk | 188/106 F X |
| 4,042,073 | 8/1977 | Dickenson | 188/72.9 |
| 4,305,482 | 12/1981 | Arai | 188/72.9 X |
| 4,354,582 | 10/1982 | Severinsson | 188/197 X |

FOREIGN PATENT DOCUMENTS

| | | | |
|---|---|---|---|
| 1290837 | 7/1965 | Fed. Rep. of Germany ... | 188/106 F |
| 1232487 | 1/1967 | Fed. Rep. of Germany ..... | 188/72.9 |
| 309664 | 9/1955 | Switzerland | 74/520 |
| 316057 | 9/1956 | Switzerland | 188/72.9 |
| 397705 | 2/1974 | U.S.S.R. | 74/520 |

*Primary Examiner*—George E. A. Halvosa
*Assistant Examiner*—Matthew C. Graham
*Attorney, Agent, or Firm*—Laurence R. Brown

[57] ABSTRACT

A rail vehicle brake unit having a tubular housing and a slack adjuster movable therein in a brake force applying direction in response to a braking force applied to a push rod has a simple parking brake attachment. Thus, a sleeve abutting the slack adjuster presents a movable shoulder, which in turn is coupled with a pivoted parking brake lever for movement thereby to actuate the brakes.

5 Claims, 2 Drawing Figures

PARKING BRAKE ARRANGEMENT FOR A RAIL VEHICLE BRAKE UNIT

TECHNICAL FIELD

This invention relates to a parking brake arrangement for a rail vehicle brake unit, comprising a tubular housing and a slack adjuster member movable in a brake force applying direction concurrently with a force delivering push rod of the unit.

BACKGROUND OF THE INVENTION

Normally, a vehicle provided with a brake unit for each wheel, brake disc or axle also needs a parking brake arrangement, which may be combined with one or more of the brake units on the vehicle. For different reaons it is advantageous to have a common type of brake unit only modified as slightly as possible for arriving at the parking brake version. The ultimate solution of course is that only a very limited number of parts are added to a normal brake untf for reaching its parking brake version. Hereby it has to be kept in mind that the parking brake force should be applied to an outgoing push rod or a part connected thereto.

THE INVENTION

An extremely simple, cheap, versatile and reliable parking brake arrangement of the type referred to above is according to the invention attained in that a sleeve added exclusively for parking braking and provided wth a shoulder is slidably arranged on the housing and abuts the slack adjuster member in said direction and in that at least one parking brake lever—in a manner known per se—is pivotally attached to the unit and abuts the shoulder with its end.

Normally, the unit is provided with two fixed mounting brakcets one at each side of the housing, which are used for the mounting of the unit to a suitable part of the rail vehcile in the vicinity of the wheel or disc to be braked.

These two mounting brackets may in two embodiments of the invention have somehat different tasks for the pivotal attachment of the brake levers to the unit.

In a first embodiment a parking brake bracket is fixedly attached to each mounting bracket and a parking brake lever is pivotally attached to the parking brake bracket.

In a second embodiment two generally co-directional parking brake levers are pivotally attached to each mounting bracket at a common pivot point, whereby two levers extend past the pivot point and are joined by a roller for abutting the shoulder, whereas the two other levers only extend to the pivot point and are joined by a roller for abutting the shoulder, the distances between the respective rollers and the pivot point being the same.

BRIEF DESCRIPTION OF THE DRAWING

The invention will be described in further detail below reference being made to the accompanying drawing, in which.

DESCRIPTION OF PREFERRED EMBODIMENTS

A conventional brake unit 1 comprises—as is well known in the art—a brake cyliner and a slack adjuster built together as a self-contained unit. Its outgoing push rod 2 is to be attached to parts of a rail vehicle brake rigging (not shown), and the unit itself is to be mounted to the underframe or bogie of the vehicle by means of mounting brackets 3 on the unit (usually one brakcet at each side of the unit).

Figure 1:
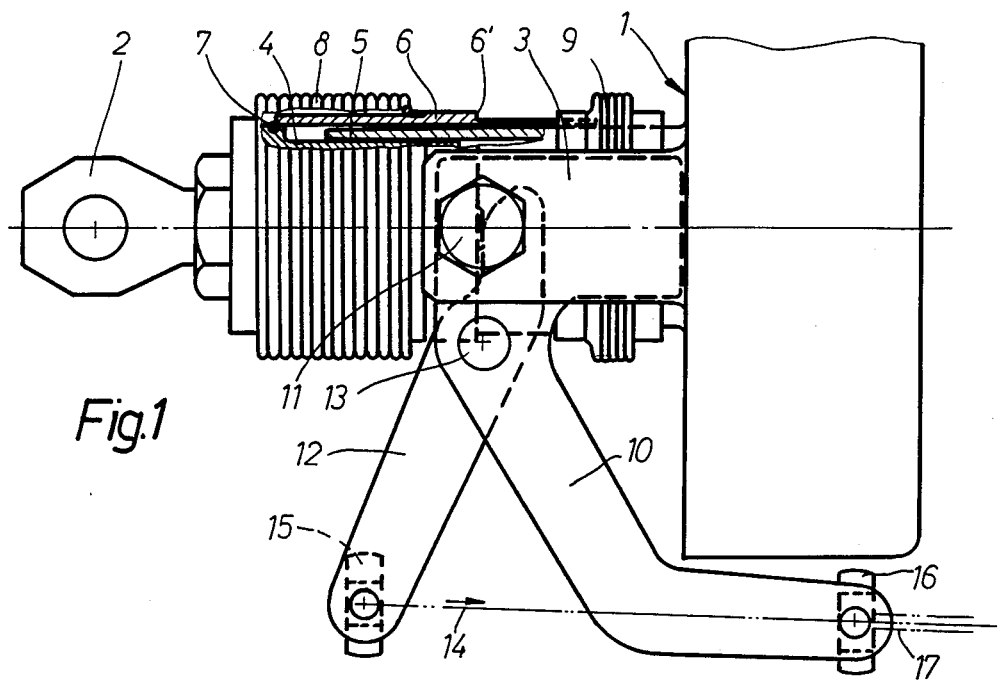
FIGS. 1 and 2 are sideviews (partly in section) showing a rail vehicle brake unit with two embodiments of a parking brake arrangement according to the invention.

In the sectioned part of FIG. 1 a member 4 of the slack adjuster mechanism is shown. This member 4 is axially movable (concurrently with the push rod 2) to the left in the drawing guided by a fixed housing 5 of the unit 1 at a brake application operation under the action of brake fluid admitted to the cylinder of the unit.

For the purpose of accomplishing a parking brake arrangement for the unit a parking brake sleeve 6 is slidably arranged on the fixed housing 5 and is intended to actuate the slack adjuster member 4 in the brake application direction over a locking ring 7 thereon. A first flexible bellows 8 is arranged between a member on the push rod 2 and the sleeve 6 and a second one 9 between the sleeve 6 and the housing 5, both for the purpose to prevent the intrusion of dirt, moisture and the like.

In the embodiment shown in FIG. 1 a fixed parking brake backet 10 is attached to each mounting bracket 3 by means of a screw 11, which can also be used for the mounting of the unit to the vehicle underframe or bogie. By its shape (indicated with dashed lines in the drawing) the parking brake bracket 10 is held stationary to the unit by the screw 11.

A parking brake lever 12 is pivoted at 13 to each bracket 10 and abuts a shoulder 6' on the parking brake sleeve 6 with its upper end (as viewed in the drawing). At its lower end the lever 12 may be actuated by a pulling force (in the direction indicated by an arrow) in a wire 14 or the like attached to an attachment 15 between the two levers 12. A similar attachment 16 can be arranged between the ends of the parking brake brackets 10 and serves as a support for a Bowden cable 17 to which the wire 14 belongs.

By means of the arrangement described above and shown in FIG. 1 a pulling force in the wire 14 is transformed into a pushing force in the push rod 2, and the force amplification depends on the length relationship between the two arms of the lever 12. (In the shown example the amplification will be 2).

Figure 2:
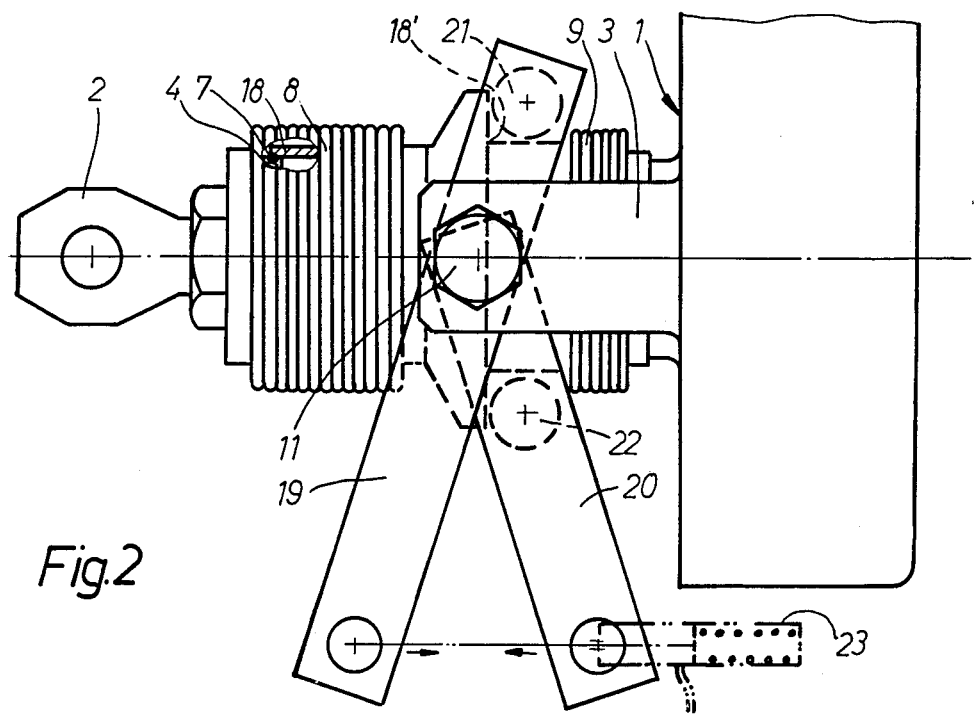

The embodiment shown in FIG. 2 differs from the one according to FIG. 1 in some important respects, but the unit 1 itself with the push rod 2, the mounting brackets 3 and the slack adjuster member 4 are the same in both versions. Also in FIG. 2 two bellows 8 and 9 are shown.

In the same manner as the FIG. 1 version a parking brake sleeve 18 is slidably mounted on the tubular housing (not shown) of the unit 1 and is provided with a comparatively large shoulder 18'. In this case two parking brake levers 19 and 20 are pivotally mounted to each bracket 3 by means of a screw 11 (which also is used for the mounting of the unit to the vehicle). The levers 19 extend past the pivot point 11 and are there joined by a roller 21 or the like, whereas in a corresponding way a roller 22 connects the two levers 20 at a distance below the pivot point 11 corresponding to the distance to the roller 21 upwards from the pivot point.

The rollers 21 and 22 cooperate as shown in FIG. 2 with the shoulder 18', and it is obvious that by urging the ends of the levers 19 and 20 together—as indicated by the arrows—the rollers 21 and 22 will apply a balanced force on the shoulder 18', resulting in a brake applying push force in the push rod 2. In the shown case, where the length ratio between the two parts of the respective lever 19 and 20 is 2.5, a total force amplification of 5 times is attained.

Many ways of practically accomplishing counteracting forces on the ends of the levers 19 and 20 are conceivable. Only one possibility is indicated in FIG. 2. A fluid operated pulling cylinder 23 may be connected with its housing to lever 20 and with its piston rod to lever 19. Also a wire arrangement to the side of the vehicle is possible in a corresponding manner as is shown in FIG. 1.

It is to be noted that in both the two shown and described versions the difference between units with and without parking brake arrangements is very slight and that a modification of a unit without parking brake to one with a parking brake is easy and cheap. Thus, in the unit itself it is only necesssary to add the sleeve 6 or 18 and the ring 7 as well as to mount the bellows 8 and 9, whereas the outer levers and other members as described are easily mountable on the existing mounting brackets 3 without modifications.

We claim:

1. A parking brake arrangement for a rail vehicle brake unit, comprising: a brake unit housing; a push rod extending outwardly from the brake unit housing and movable axially; service brake actuation means connected witht he push rod to selectively engage and disengage a service brake; a tubular housing extending from the brake unit housing; slack adjuster means movable relative to the tubular housing along the push rod axis in a brake force applying direction; parking brake sleeve means surrounding the tubular housing and slidable relative thereto, the parking brake sleeve means provided with a shoulder and in abutting relationship with the slack adjuster means and connected with the push rod; and at least one parking brake lever pivotally carried by the brake unit housing and abutting the shoulder of the parking brake sleeve means to move the parking brake sleeve means and the push rod to selectively engage the brake unit independently of the service brake actuation means.

2. An arrangement according to claim 1, wherein the unit includes two fixed mounting brackets, one at each side of the tubular housing and wherein a parking brake bracket is fixedly attached to each mounting bracket and a parking brake lever is pivotally attached to the parking brake bracket.

3. An arrangment according to claim 1, wherein the unit includes two fixed mounting brackets, one at each side of the tubular housing, and a pair of generally codirectional parking brake levers are pivotally attached to each mounting bracket at a common pivot point, whereby one of each pair of levers extends past the pivot point and carries a first roller for abutting the shoulder on the parking brake sleeve means, whereas the other of each pair of levers carries a second roller for abutting the shoulder on the parking brake sleeve means, each of the rollers positioned on opposite sides of the pivot and the distances beween the respective rollers and the pivot being the same.

4. A brake arrangement or a rail vehicle comprising in combination, a service brake unit containing an axially movable push rod and first brake actuation means for delivering a braking force; a slack adjuster member carried by an movable with the push rod; a tubular housing carried by the service brake unit and surrounding the slack adjuster member; second brake actuation means moving the push rod independently of the first brake actuation means, said second brake actuation means including a parking brake sleeve means slidably carried on and surrounding the tubular housing and abutting the slack adjuster member to move it and the push rod in a braking direction, parking brake lever means pivotally carried relative to the service brake unit to pivot in response to a parking brake actuation force, and shoulder means on said parking brake sleeve means and in abutting contact with the parking brake lever means to cause movement of the push rod in a braking direction in response to a parking brake force applied to the parking brake lever means.

5. The brake arrangement of claim 4 wherein the shoulder means abuts the lever member at a plurality of positions about the tubular housing.

* * * * *